United States Patent
Cheng

(10) Patent No.: US 8,043,572 B2
(45) Date of Patent: Oct. 25, 2011

(54) ROLLING REGENERATION DIESEL PARTICULATE TRAP

(75) Inventor: Shi-Wai S. Cheng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1311 days.

(21) Appl. No.: 10/787,431

(22) Filed: Feb. 26, 2004

(65) Prior Publication Data

US 2004/0166041 A1 Aug. 26, 2004

Related U.S. Application Data

(62) Division of application No. 09/996,850, filed on Nov. 21, 2001, now Pat. No. 6,770,252.

(51) Int. Cl.
*B01D 50/00* (2006.01)
(52) U.S. Cl. ............ 422/171; 422/169; 422/170; 55/327
(58) Field of Classification Search .................. 422/169, 422/170, 171; 55/327
See application file for complete search history.

(56) References Cited

U.S. PATENT DOCUMENTS

| | | | | |
|---|---|---|---|---|
| 3,290,876 A | * | 12/1966 | Ernst | 422/169 |
| 3,319,793 A | * | 5/1967 | Miller, Jr. et al. | 210/243 |
| 4,264,344 A | * | 4/1981 | Ludecke et al. | 55/313 |
| 4,426,320 A | * | 1/1984 | Ernest et al. | 502/313 |
| 5,431,706 A | * | 7/1995 | Paas | 55/342 |
| 5,582,800 A | * | 12/1996 | Galloway | 422/125 |
| 5,707,593 A | * | 1/1998 | Wang | 422/171 |
| 5,853,579 A | * | 12/1998 | Rummler et al. | 210/170.01 |
| 5,873,918 A | * | 2/1999 | Dillman et al. | 55/282.3 |
| 6,488,842 B2 | * | 12/2002 | Nagaoka | 210/136 |
| 6,770,252 B2 | * | 8/2004 | Cheng | 423/239.1 |
| 6,808,688 B1 | * | 10/2004 | Saito et al. | 422/177 |

* cited by examiner

*Primary Examiner* — Jessica L Ward
*Assistant Examiner* — Paul Wartalowicz
(74) *Attorney, Agent, or Firm* — Reising Ethington P.C.

(57) ABSTRACT

A rolling regeneration diesel particulate filter and filtering process that utilizes NO produced in the process to generate additional amounts of $NO_2$ than the $NO_2$ produced by the diesel engine. The process includes the step of flowing diesel engine combustion exhaust through a filter system including a first section and a second section. The first section is positioned upstream of the second section with respect to the direction of the flow of the diesel engine exhaust through the filter. The first section includes a foam constructed and arranged to trap carbon-based particulates in the exhaust. A first catalyst is carried by the foam to promote the conversion of NO in the exhaust from the diesel engine to $NO_2$. The first catalyst also promotes the reaction of $NO_2$ with at least a portion of the carbon-based particulates trapped by the foam to form CO and NO. The first catalyst carried by the foam also promotes the oxidation of CO to $CO_2$, and the oxidation of NO, generated by the reaction of $NO_2$ with carbon, to generate additional amounts of $NO_2$.

23 Claims, 3 Drawing Sheets

ROLLING REGENERATION DIESEL PARTICULATE TRAP

RELATED APPLICATION

This application is a division of U.S. Ser. No. 09/996,850 filed on Nov. 21, 2001 now U.S. Pat. No. 6,770,252.

TECHNICAL FIELD

This invention relates to filter systems, and more particularly to a filter system for a diesel engine utilizing a rolling regeneration diesel particulate trap.

BACKGROUND OF THE INVENTION

FIG. 1 illustrates a prior art filter system 10 for a diesel engine 12. An exhaust line 14 is provided between the diesel engine 12 and the filter system 10. The filter system may include a housing 16 that includes at least a first section 18 and a second section 20. The first section 18 typically includes a flow-through monolith 22 therein and wherein the flow-through monolith is coated with a catalyst such as platinum. The exhaust gas from the diesel engine 12 includes a variety of constituents including NO and particulate matter which typically is in the form of a carbon-based material. The catalyst on the flow-through monolith 22 promotes the reaction of the NO with oxygen also present in the exhaust gas to form $NO_2$. However, the reaction is not efficient enough to completely convert all of the NO in the exhaust gas to $NO_2$. Thus, as shown in FIG. 1, both NO and $NO_2$ leave the first section 18 of the filter and enter the second section 20 of the filter system. The second section 20 typically includes a wall flow monolith 24 therein. Wall flow monoliths are known to those skilled in the art and typically are manufactured from a ceramic material in a manner to provide a plurality of through hole cells running the longitudinal length of the monolith. The cross-sectional area of these through hole cells is extremely small, on the order of 10 microns. Wall flow monoliths are capable of trapping 99+ percent of the particulate emissions from a diesel engine. However, wall flow monoliths can become plugged very easily due to the very small openings of the through hole cells. As shown in FIG. 1, $NO_2$ in the exhaust gas can be used to oxidize the carbon to form NO and CO, thus removing some of the particulate blocking the wall flow monolith. However, the amount of $NO_2$ present in the exhaust gas from the diesel engine or generated in the flow-through monolith 22 may not be sufficient to completely oxidize the particulate blocking the wall flow monolith. Accordingly, the engine must be operated in order to generate substantial amounts of $NO_2$ necessary to oxidize all the carbon and other particulate matter blocking the wall flow monolith. Otherwise, the wall flow monolith must be cleaned in another fashion.

Thus, it would be desirable to provide a filter system for a diesel engine which resulted in the wall flow monolith being plugged less often and providing an alternative means for regenerating the trap. The present invention overcomes deficiencies in the prior art and provides alternatives and advantages thereto.

SUMMARY OF THE INVENTION

The invention includes a rolling regeneration diesel particulate filter and filtering process that reuses NO produced in the process to generate additional amounts of $NO_2$. One embodiment of the invention includes a process including flowing diesel engine combustion exhaust through a filter system including a first and a second section. The first section is positioned upstream of the second section with respect to the flow direction of the exhaust. The first section includes a foam constructed and arranged to trap carbon-based particulates in the exhaust. A first catalyst is carried by the foam to promote the conversion of NO in the exhaust from the diesel engine to $NO_2$. The $NO_2$ is used to oxidize particulates trapped by the foam to form CO and NO. The first catalyst or a second catalyst on the foam further promotes the oxidation of CO to $CO_2$, and the oxidation of NO, generated by the reaction of $NO_2$ with carbon, to generate additional $NO_2$. The second section of the filter system includes a wall flow filter having a plurality of through hole cells formed therein running the longitudinal length of the wall flow filter. The wall flow filter is constructed and arranged to trap particulates in the exhaust and to promote the reaction of $NO_2$ and carbon to produce NO and CO.

In another embodiment of the invention, the foam may include a ceramic foam made from $Al_2O_3$.

In another embodiment of the invention, the ceramic foam may also include $ZrO_2$.

In another embodiment of the invention, the first catalyst may include platinum. The platinum may be coated on the foam in a loading of at least 25 grams per cubic foot of foam.

In another embodiment of the invention, the foam may have a porosity ranging from 80% to 90% and higher.

In another embodiment of the invention, the foam may include 10 to 60 pores per inch.

In another embodiment of the invention, the wall flow filter may include 25 to 300 cells per square inch of cross-sectional area of the monolith.

In another embodiment of the invention, the filter system may include a housing. The first and second sections of the filter system may be carried in the housing.

Another embodiment of the invention includes a rolling regeneration diesel particulate filter trap having a first and a second section. The first section is positioned upstream of the second section with respect to the direction of exhaust flow through the trap. The first section includes a foam constructed and arranged to trap carbon particulates in the exhaust. A first catalyst is carried by the foam to promote the conversion of NO in the exhaust flowing through the trap to $NO_2$. The $NO_2$ is used to oxidize the carbon particulates trapped by the foam to form CO and NO. The first catalyst or a second catalyst in the foam further promotes the oxidation of the CO to $CO_2$ and the oxidation of NO, generated by the reaction of $NO_2$ and C to generate additional $NO_2$. The second section of the trap includes a wall flow filter having a plurality of through hole cells formed therein running the longitudinal length of the filter. The filter is constructed and arranged to trap particulates in the exhaust and to promote the reaction of $NO_2$ and C to produce NO and CO.

Another embodiment of the invention includes a diesel engine exhaust filter system including a catalyzed foam filter and wall flow filter combination, wherein at least a portion of the wall flow filter surrounds a portion of the catalyzed foam filter and so that exhaust may flow through the catalyzed foam filter and then flow through the wall flow filter.

Another embodiment of the invention includes a diesel engine exhaust filter system having a plurality of filter combinations, and wherein each filter combination includes a catalyzed foam filter and wall flow filter, and wherein at least a portion of each wall flow filter surrounds a portion of a catalyzed foam filter and so the exhaust may flow through the catalyzed foam filter and then flow through the wall flow filter.

These and other objects, features and advantages will become apparent from the following brief description of the drawings, detailed description of the preferred embodiments, and appended claims and drawings.

DESCRIPTION OF THE PREFERRED EMBODIMENTS

Figure 1:
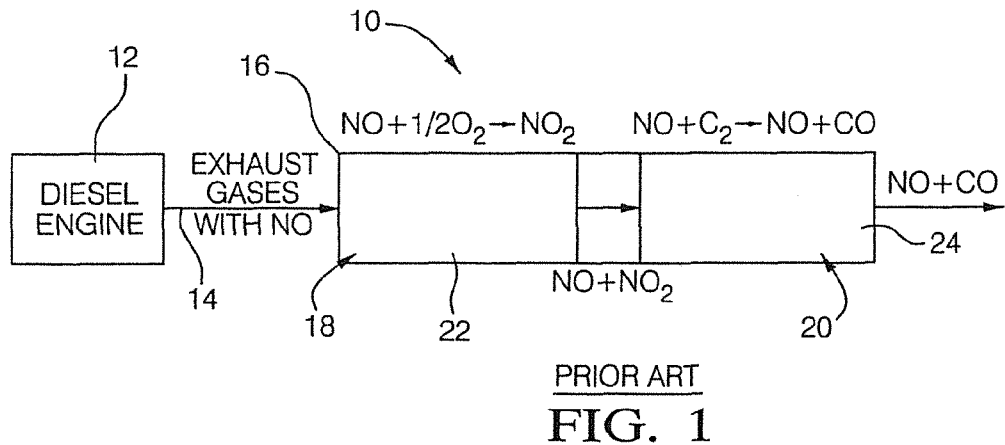
FIG. 1 illustrates a prior art diesel particulate filter system.
Figure 2:
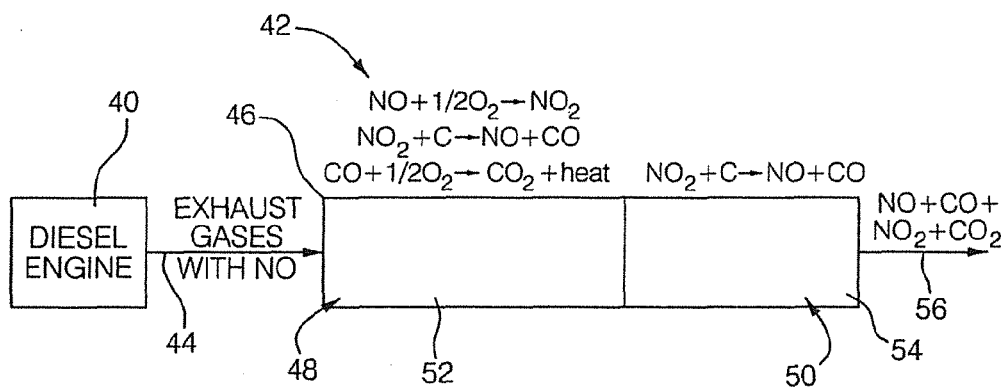
FIG. 2 illustrates a rolling regeneration diesel particulate filter system according to the present invention.

FIG. 2 illustrates a diesel engine 40 connected to a filter system 42 according to the present invention. An exhaust line 44 is provided connected at one end to the diesel engine 40 and at the other end to the filter system 42. The filter system 42 may include a housing 46 enclosing a first section 48 and a second section 50. The first section 48 includes a foam 52 having a catalyst carried by the foam. The term "catalyst carried by the foam" as used herein means a catalyst coated on, absorbed, adsorbed and/or embedded in the foam. A preferred catalyst is platinum. Preferably, the foam is made from a ceramic material such as $Al_2O_3$ and/or $ZrO_2$. The platinum is coated on the foam in a loading of at least 25 grams per cubic foot of the foam, and more preferably 50 grams or greater per cubic foot of the foam. The foam is constructed and arranged to have a porosity of at least 80% to 90% or greater. The foam preferably includes 10 to 60 pores per inch. The pores are open to provide a tortuous flow path for the diesel exhaust flowing through the foam. As a result, the catalyst on the foam promotes the reaction of NO in the exhaust with oxygen (also in the exhaust) to form $NO_2$. The foam also is constructed and arranged to trap particulate matter such as soot and carbon-based materials in the foam. The $NO_2$ (present in the exhaust and generated by the reaction of NO and oxygen to form $NO_2$) is used to oxidize carbon (particulate matter) trapped in the foam to form NO and CO. The catalyst on the foam also promotes the oxidation of the newly-formed NO (from the reaction of $NO_2$ and C) to provide an additional source of $NO_2$ than that which is present in the exhaust gases upon immediate exit from the diesel engine. The catalyst on the foam also promotes the reaction of CO and oxygen to form $CO_2$ and heat.

The second section 50 of the filter system 42 includes a wall flow filter (or monolith) 54 which preferably is made from a ceramic material and includes a plurality of through hole cells formed therein running the longitudinal length of the filter 54. The filter 54 is constructed and arranged to trap particulate matter in the exhaust and to promote the reaction of $NO_2$ and carbon (particulate matter) to produce NO and CO. Preferably, the filter 54 includes at least 25 to 300 cells per square inch of a cross-sectional area of the monolith. The effluent line 56 exiting the filter system 42 includes NO, CO, $NO_2$ and $CO_2$. Additional filtering and purification operations may be conducted on the effluent 56 by downstream components (not shown).

Figure 3:
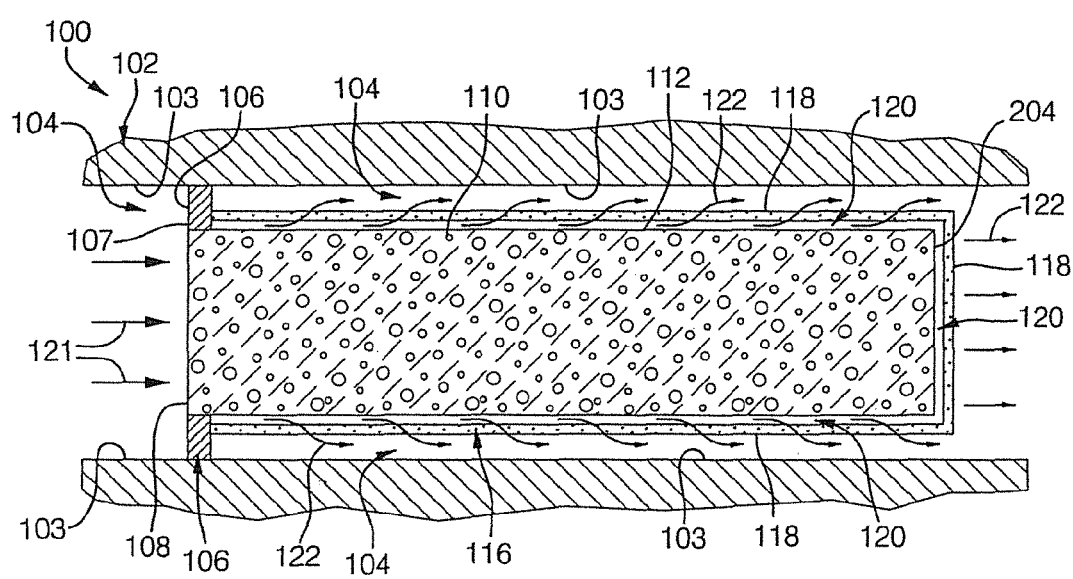
FIG. 3 is a sectional view illustrating another embodiment of the present invention which includes a diesel engine exhaust filter system including a catalyzed foam filter and wall flow filter combination.
Figure 5:
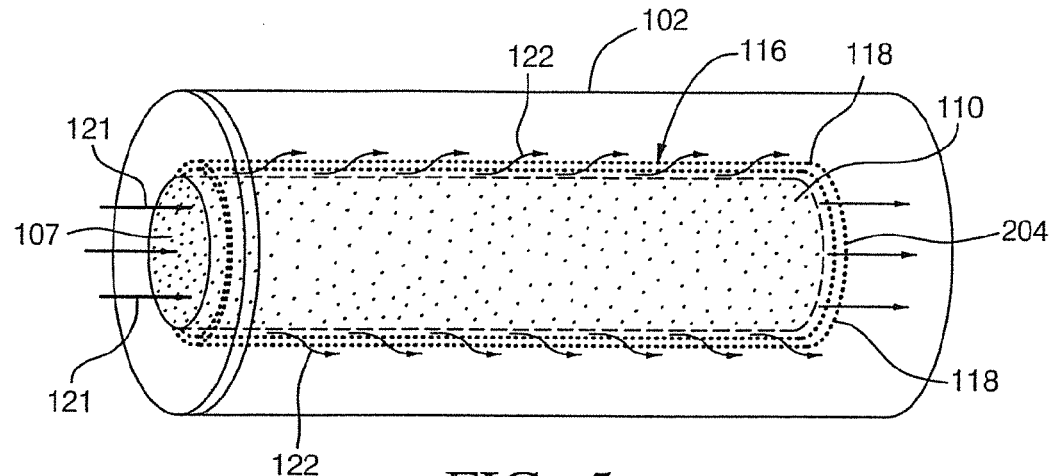
FIG. 5 is a perspective view of a diesel exhaust filter system with a single catalyzed foam filter and wall flow filter combination.

FIG. 3 is a sectional view illustrating another embodiment of the present invention which includes a diesel engine exhaust filter system 100 including a catalyzed foam filter 110 and wall flow filter 116 combination. The term "catalyzed foam filter" as used herein means a foam having a catalyst coated on, absorbed, adsorbed and/or embedded in the foam. The diesel engine exhaust system 100 includes an exhaust conduit 102 which naturally includes a cavity 104 through which exhaust from a diesel combustion engine flows from the combustion engine through the exhaust conduit 102 and is eventually expelled to the atmosphere. The system 100 includes the catalyzed foam filter 110 having open pores (as described above) and the wall flow filter 116 housed in the cavity 104 of the exhaust conduit 102. The wall flow filter 116 is preferably a single cell structure and includes a porous wall 118 that is spaced a distance from an inner surface 103 of the conduit 102. Preferably, the catalyzed foam filter 110 and the wall flow filter 116 are both supported by a separator 106 that extends between inner surfaces 103 of the conduit 102. Preferably, the separator 106 includes an opening 107 therethrough exposing a front face 108 of the catalyzed foam filter 110 so that exhaust gases may flow through the opening 107 in the separator 106 and into the foam 110. The exhaust gases flow in the direction of arrows 121 from the diesel combustion engine flow towards the front face 108 of the catalyzed foam filter 110, through the catalyzed foam filter 110, and through a porous wall 118 of the wall flow filter 116 as indicated by arrows 122. Particulates are trapped by the catalyzed foam filter 110, and by the wall flow filter 116 in a space 120 between the catalyzed foam filter 110 and the wall 118 of the wall flow filter 116. The porous wall 118 may be any suitable material such as a ceramic, including, for example, alumina with 10 to 20 micron pore size and a porosity of 40% or greater. The wall 118 may have a thickness of 0.25 mm to 1 mm, and preferably 0.5 mm. The catalyzed foam filter 110 includes a longitudinal side (or sides) edge or peripheral edge 112 and a rear face 204. The side edge 112 and rear face 204 are each spaced a distance of about 2 mm to 5 mm from the porous wall 118 of the wall flow filter 116 to provide the space 120 therebetween for the accumulation of particulates in the diesel exhaust gas. Preferably, at least a portion of the wall flow filter 116 surrounds a portion of the catalyzed foam filter 110. In a preferred embodiment, the wall flow filter 116 surrounds the catalyzed foam filter 110 along at least a portion of the longitudinal side edge 112 and the rear face 204 of the catalyzed foam 110. However, it is also contemplated that a solid cap (not shown) may be provided adjacent the rear face 204 to force the flow of exhaust gas out of the side edge 112 and not out of the rear face 204. A perspective view of a diesel exhaust filter system with a single catalyzed foam filter 110 and wall flow filter 116 combination is shown in FIG. 5.

Figure 4:
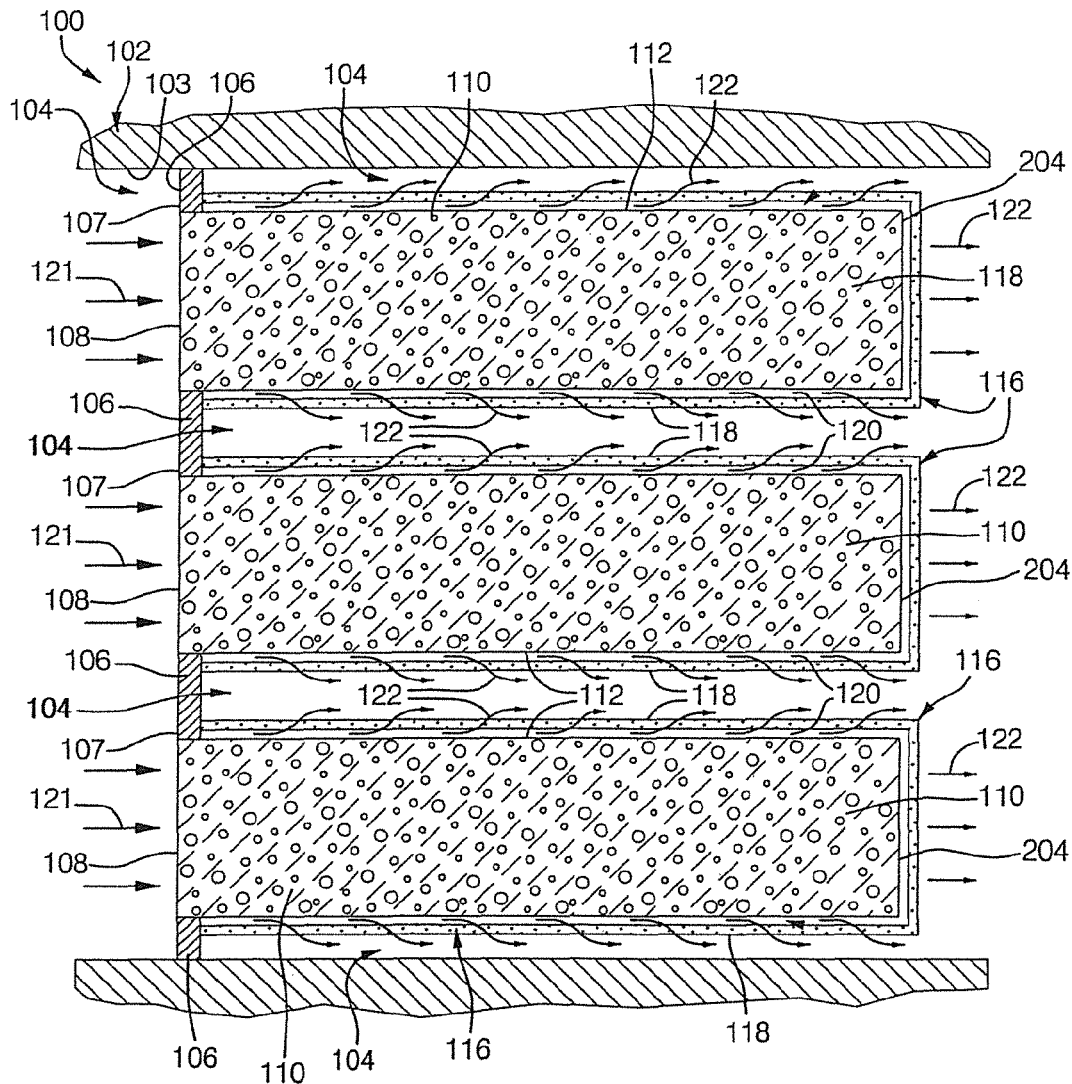
FIG. 4 is a sectional view illustrating an alternative embodiment of the invention wherein a plurality of catalyzed foam filter and wall flow filter combinations are received in the cavity of the exhaust conduit.
Figure 6:
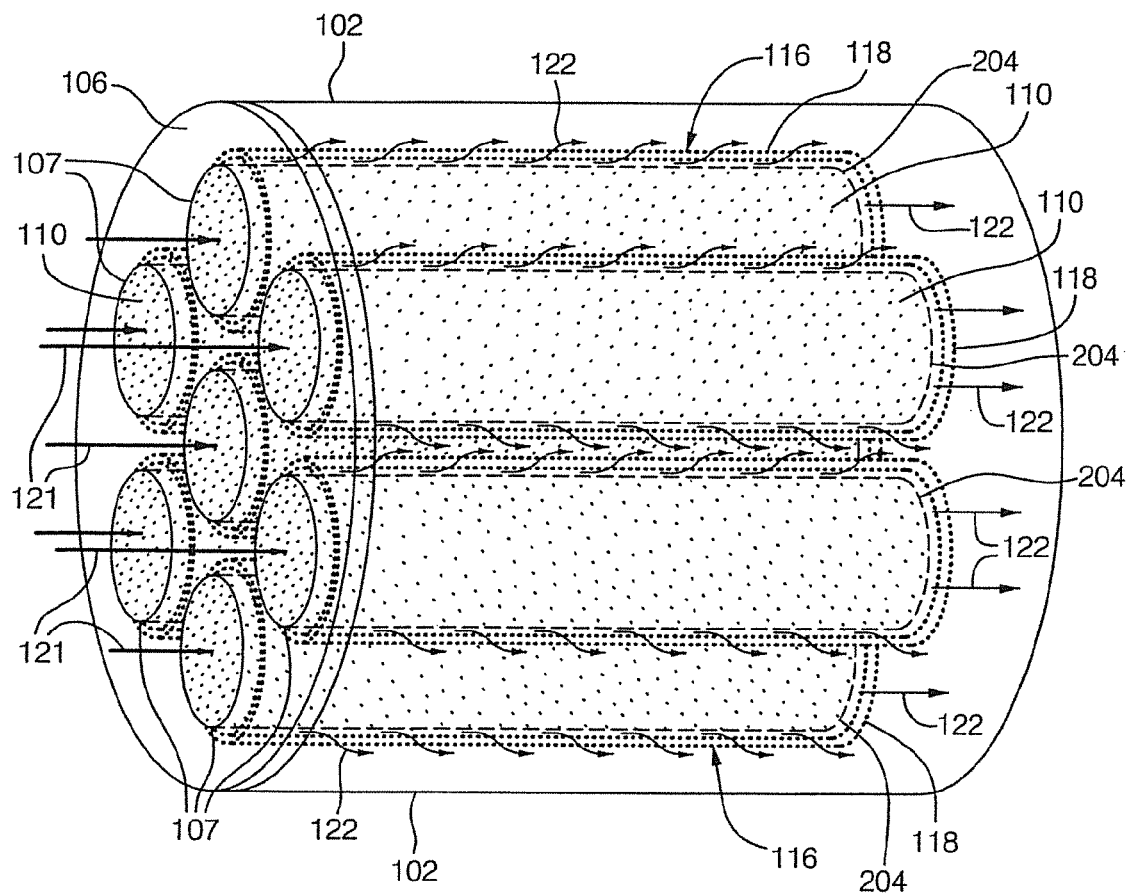
FIG. 6 is a perspective view of a diesel exhaust filter system with multiple catalyzed foam filter and wall flow filter combinations.

FIG. 4 is a sectional view illustrating an alternative embodiment of the invention wherein a plurality of catalyzed foam filter 110 and wall flow filter 116 combinations are received in the cavity 104 of the exhaust conduit 102. Preferably, each of the catalyzed foam filter 110 and wall flow filter 116 combinations are supported by the separator 106 that has a plurality of openings 107 therethrough, one opening 107 for each of the combinations (110 and 116). A perspective view of a diesel exhaust filter system with multiple catalyzed foam filter 110 and wall flow filter 116 combinations is shown in FIG. 6.

Figure 7:
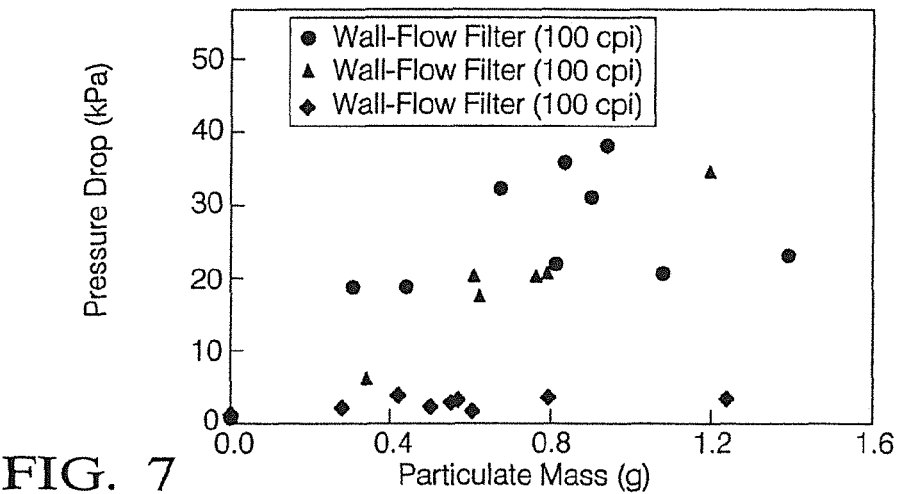
FIG. 7 is a graphic illustration of the pressure drop due to soot (particulate) accumulation on wall flow filters versus ceramic foams.

FIG. 7 is a graphic depiction of the pressure drop versus particulate mass loading for a 100 cells per inch wall flow filter, a 200 cells per inch wall flow filter and a ceramic foam having a porosity ranging from 80% to 90% and about 10 to 60 pores per square inch. As will be appreciated, a ceramic foam used according to the present invention has a pressure drop of about 1/10 or less than wall flow filters. This allows the present invention to incorporate a foam coated with a catalyst such as platinum thereon to be used to trap particulate matter, thus reducing the particulate loading on the downstream wall flow filter. Due to the tortuous flow path of the exhaust through the foam, $NO_2$ is generated in addition to the $NO_2$ present in the exhaust gas from the diesel engine. The additional $NO_2$ helps to oxidize carbon trapped in the foam and carbon trapped by the downstream wall flow monolith. As a consequence, the foam and the downstream wall flow monolith do not have to be cleaned as often to reduce particulate as prior art systems.

The invention claimed is:

1. A product comprising:
    a regeneration particulate trap comprising a catalyzed foam filter and wall flow filter combination, wherein the wall flow filter has at least one through hole cell formed therein running the longitudinal length of the wall flow filter and wherein at least a portion of the wall flow filter circumferentially surrounds a portion of the catalyzed foam filter and wherein the catalyzed foam filter and wall flow filter are constructed and arranged so that exhaust first flows through the catalyzed foam filter and then flows through the wall flow filter and wherein the catalyzed foam filter includes a side edge and a rear face and wherein the wall flow filter circumferentially surrounds at least a portion of the side edge to trap particulate matter between the wall flow filter and the catalyzed foam filter, wherein a first space is located between the side edge and the rear face of the catalyzed foam filter and an inner surface of the wall flow filter, wherein a second space is located between an outer surface of the wall flow filter and an inner surface of an exhaust conduit which circumferentially surrounds the wall flow filter, wherein exhaust flows in a radial direction through the catalyzed foam filter, through the first space, through the wall flow filter, and then to the second space, and wherein exhaust flows in an axial direction through the catalyzed foam filter, through the first space, and then through the wall flow filter, and wherein the catalyzed foam filter comprises a catalyst constructed and arranged to convert NO in engine combustion exhaust flowing through the product to $NO_2$ and so that additional $NO_2$ is in the exhaust stream an amount sufficient to oxidize carbon particulates trapped by the catalyzed foam filter and wall filter combination.

2. A product as set forth in claim 1 wherein the wall flow filter surrounds the rear face of the catalyzed foam filter.

3. A product as set forth in claim 1 wherein the wall flow filter is a single cell wall flow filter.

4. A product as set forth in claim 1 wherein the wall flow filter comprises a porous wall, a portion of which is spaced a distance from the rear face of the catalyzed foam filter.

5. A product as set forth in claim 1 further comprising engine exhaust gas flowing through the catalyzed foam filter and wall flow filter.

6. A product as set forth in claim 1 further comprising a diesel engine, and an exhaust line connected to the diesel engine to flow diesel engine exhaust gases through the catalyzed foam filter and wall flow filter.

7. A product as set forth in claim 1 further comprising an engine and an exhaust line connected to the engine, the exhaust line being connected to a housing, and wherein the catalyzed foam filter and wall flow filter are received in the housing, and wherein the catalyzed foam filter includes a front face, and further comprising a separator connected to the inner surface of the housing, and the separator having an opening therethrough, and wherein the combination is supported by the separator so that the opening exposes only the front face of the catalyzed foam filter.

8. A product as set forth in claim 1 wherein the catalyzed foam filter comprises a ceramic foam.

9. A product as set forth in claim 1 wherein the catalyst foam filter comprises platinum.

10. A product as set forth in claim 1 wherein the exhaust conduit has a cavity defined by the inner surface of the exhaust conduit and wherein the combination is received in the cavity.

11. A product as set forth in claim 10 wherein the catalyzed foam filter includes a front face, and further comprising a separator connected to the inner surface of the exhaust conduit and the separator having an opening therethrough, and wherein the combination is supported by the separator so that the opening exposes the front face of the catalyzed foam filter.

12. A product comprising:
    a regeneration particulate trap comprising a plurality of filter combinations, and wherein each filter combination includes a catalyzed foam filter and wall flow filter, wherein each wall flow filter has at least one through hole cell formed therein running the longitudinal length of the wall flow filter and wherein at least a portion of each wall flow filter circumferentially surrounds a portion of a catalyzed foam filter and wherein each filter combination is constructed and arranged so the exhaust first flows through the catalyzed foam filter and then flows through the wall flow filter and wherein each catalyzed foam filter includes a side edge and wherein one of the wall flow filters circumferentially surrounds at least a portion of the side edge to trap particulate matter between the wall flow filter and the catalyzed foam filter, wherein a first space is located between the side edge of the catalyzed foam filter and an inner surface of the wall flow filter, wherein a second space is located between an outer surface of the wall flow filter and an inner surface of an exhaust conduit which circumferentially surrounds the wall flow filter, and wherein exhaust flows in a radial direction through the catalyzed foam filter, through the first space, through the wall flow filter, and then to the second space, and wherein the catalyzed foam filter comprises a catalyst constructed and arranged to convert NO in engine combustion exhaust flowing through the product to $NO_2$ and so that additional $NO_2$ is in the exhaust stream an amount sufficient to oxidize carbon particulates trapped by the catalyzed foam filter and wall filter combination.

13. A product as set forth in claim 12 wherein each catalyzed foam filter further includes a rear face and wherein the wall flow filter surrounds the rear face of the catalyzed foam filter.

14. A product as set forth in claim 12 further comprising engine exhaust gas flowing through the plurality of filter combinations.

15. A product as set forth in claim 12 further comprising a combustion engine and an exhaust line connected to the combustion engine and constructed and arranged to flow engine exhaust gas through the plurality of filter combinations.

16. A product as set forth in claim 12 wherein the catalyzed foam filter comprises a ceramic foam.

17. A product as set forth in claim 12 wherein the exhaust conduit has a cavity defined by the inner surface of the exhaust conduit and wherein each combination is received in the cavity.

18. A product as set forth in claim 12 wherein each catalyzed foam filter includes a front face, and further comprising a separator connected to the inner surface of the exhaust conduit and the separator having a plurality of openings therethrough, and wherein each opening is constructed and arranged to expose the front face of one of the catalyzed foam filters.

19. A product comprising:
a regeneration particulate trap comprising an engine exhaust filter system comprising a catalyzed foam filter and wall flow filter, wherein the wall flow filter has at least one through hole cell formed therein running the longitudinal length of the wall flow filter and wherein the catalyzed foam filter includes a side edge and a rear face and wherein the wall flow filter circumferentially surrounds at least a portion of the side edge, and so that a first space is provided between the wall flow filter and the side edge sufficient to trap particulate matter in the first space, and wherein the combination is constructed and arranged so that the exhaust first flows through the catalyzed foam filter and then flows through the wall flow filter, and wherein a second space is located between an outer surface of the wall flow filter and an inner surface of an exhaust conduit which circumferentially surrounds the wall flow filter, wherein exhaust flows in a radial direction through the catalyzed foam filter, through the first space, through the wall flow filter, and then to the second space, and wherein the catalyzed foam filter comprises a catalyst constructed and arranged to convert NO in engine combustion exhaust flowing through the product to $NO_2$ and so that additional $NO_2$ is in the exhaust stream an amount sufficient to oxidize carbon particulates trapped by the catalyzed foam filter and wall filter combination.

20. A product as set forth in claim 19 wherein the exhaust conduit has a cavity defined by the inner surface of the exhaust conduit and wherein the combination is received in the cavity, and wherein the catalyzed foam filter includes a front face, and further comprising a separator connected to the inner surface and the separator having an opening therethrough, and wherein the combination is supported by the separator so that the opening exposes only the front face of the catalyzed foam filter.

21. A product as set forth in claim 20 further comprising an engine, and an exhaust line connected to the engine, and the exhaust line being connected to the conduit and constructed and arranged to flow engine exhaust gas through the opening in the separator.

22. A product comprising:
a diesel engine exhaust filter system comprising a plurality of filter combinations, and wherein each filter combination comprises a regeneration particulate trap comprising a catalyzed foam filter and a wall flow filter, wherein each wall flow filter has at least one through hole cell formed therein running the longitudinal length of the wall flow filter and wherein the catalyzed foam filter and wall flow filter are constructed and arranged so diesel engine exhaust gas first flows through the catalyzed foam filter and then flows through the wall flow filter and wherein each catalyzed foam filter includes a side edge and wherein one of the wall flow filters circumferentially surrounds at least a portion of the side edge, and so that a first space is provided between the one of the wall flow filters and the side edge sufficient to trap particulate matter therein, further comprising a housing having an inner surface, and wherein each catalyzed foam filter includes a front face, and further comprising a separator connected to the inner surface and the separator having a plurality of openings therethrough, wherein each opening is constructed and arranged to expose only the front face of one of the catalyzed foam filters, wherein a second space is located between an outer surface of the wall flow filter and the inner surface of the housing, and wherein exhaust gas flows in a radial direction through the catalyzed foam filter, through the first space, through the wall flow filter, and then to the second space, and wherein the catalyzed foam filter comprises a catalyst constructed and arranged to convert NO in engine combustion exhaust flowing through the product to $NO_2$ and so that additional $NO_2$ is in the exhaust stream an amount sufficient to oxidize carbon particulates trapped by the catalyzed foam filter and wall filter combination.

23. A product as set forth in claim 22 further comprising a diesel engine, and an exhaust line connected to the diesel engine and to the housing and constructed and arranged to flow diesel engine exhaust gas through each opening in the separator.

* * * * *